(12) United States Patent
Kaiser

(10) Patent No.: US 7,676,489 B2
(45) Date of Patent: Mar. 9, 2010

(54) PROVIDING NATURAL-LANGUAGE INTERFACE TO REPOSITORY

(75) Inventor: Matthias Kaiser, Mountain View, CA (US)

(73) Assignee: SAP AG, Walldorf (DE)

( * ) Notice: Subject to any disclaimer, the term of this patent is extended or adjusted under 35 U.S.C. 154(b) by 242 days.

(21) Appl. No.: 11/294,992

(22) Filed: Dec. 6, 2005

(65) Prior Publication Data

US 2007/0130194 A1 Jun. 7, 2007

(51) Int. Cl.
*G06F 17/30* (2006.01)
(52) U.S. Cl. .................. 707/102; 707/101; 707/100
(58) Field of Classification Search .................. 707/3–5
See application file for complete search history.

(56) References Cited

U.S. PATENT DOCUMENTS 4,736,296 A 4/1988 Katayama et al.

(Continued)

FOREIGN PATENT DOCUMENTS

EP 0 692 765 1/1996

(Continued)

OTHER PUBLICATIONS

Chadha, Vineet, "Book Review: Rob's Guide to Using VMware, by Rob Bastiaansen,"[online] [retrieved on Aug. 22, 2005] <URL: http://www.virtual-strategy.com/article/articleview/538/1/2/>, pp. 1-3.

(Continued)

*Primary Examiner*—Yicun Wu
(74) *Attorney, Agent, or Firm*—Fish & Richardson P.C.

(57) ABSTRACT

Providing a natural-language interface to a repository includes retrieving information from at least one repository, and generating a computer-readable ontology using the information. The computer-readable ontology is configured for use in interpreting user-entered natural-language statements regarding the at least one repository. A computer system including at least one repository has an ontology-generating module generating a computer-readable ontology using information retrieved from the at least one repository. The ontology may be created in any or all of several forms, such as a separate entity, a pointer structure or an index.

12 Claims, 3 Drawing Sheets

U.S. PATENT DOCUMENTS

| | | | |
|---|---|---|---|
| 4,914,590 | A | 4/1990 | Loatman et al. |
| 4,930,071 | A | 5/1990 | Tou et al. |
| 4,931,935 | A | 6/1990 | Ohira et al. |
| 4,974,191 | A | 11/1990 | Amirghodsi et al. |
| 4,994,967 | A | 2/1991 | Asakawa |
| 5,239,617 | A | 8/1993 | Gardner et al. |
| 5,255,386 | A | 10/1993 | Prager |
| 5,282,265 | A | 1/1994 | Rohra Suda et al. |
| 5,369,575 | A | 11/1994 | Lamberti et al. |
| 5,577,165 | A | 11/1996 | Takebayashi et al. |
| 5,615,342 | A | 3/1997 | Johnson |
| 5,794,050 | A * | 8/1998 | Dahlgren et al. ............ 717/144 |
| 5,802,504 | A | 9/1998 | Suda et al. |
| 5,819,225 | A | 10/1998 | Eastwood et al. |
| 5,953,526 | A | 9/1999 | Day et al. |
| 6,021,403 | A | 2/2000 | Horvitz et al. |
| 6,050,898 | A | 4/2000 | Vange et al. |
| 6,101,485 | A | 8/2000 | Fortenberry et al. |
| 6,157,310 | A | 12/2000 | Milne et al. |
| 6,286,131 | B1 | 9/2001 | Beers et al. |
| 6,675,159 | B1 * | 1/2004 | Lin et al. ........................ 707/3 |
| 6,950,793 | B2 * | 9/2005 | Ross et al. ..................... 704/9 |
| 7,010,588 | B2 | 3/2006 | Martin et al. |
| 7,024,348 | B1 | 4/2006 | Scholz et al. |
| 7,027,974 | B1 * | 4/2006 | Busch et al. ................... 704/4 |
| 7,158,628 | B2 | 1/2007 | McConnell et al. |
| 7,225,183 | B2 * | 5/2007 | Gardner ......................... 707/3 |
| 7,328,209 | B2 * | 2/2008 | Das et al. ....................... 707/4 |
| 7,475,133 | B2 | 1/2009 | Nuggehalli |
| 2004/0102960 | A1 | 5/2004 | Shimomura et al. |
| 2004/0181390 | A1 | 9/2004 | Manson |

FOREIGN PATENT DOCUMENTS

| | | |
|---|---|---|
| GB | 2 153 560 | 8/1985 |

OTHER PUBLICATIONS

Kerkez et al., "Incremental Case-Based Plan Recognition Using State Indices," [online]. [Retrieved on Aug. 22, 2005] Retrieved from the Internet: <URL: http://www.cs.wright.edu/~mcox/Papers/kerkez-cox-iccbr01.pdf> pp. 1-15.

"A Guide to GOMS Task Analysis," [online] David Kieras 1994. Retrieved from the Internet <URL: http://www-static.cc.gatech.edu/computing/classes/cs6751_98_fall/handouts/GOMS-Kieras.html> pp. 1-47.

McCarthy, John, "Actions and Other Events in Situation Calculus," [online]. Computer Science Department Stanford University Stanford, Feb. 8, 2002. Retrieved from the Internet URL < http://www-formal.stanford.edu/jmc/sitcalc/sitcalc.html> pp. 1-13.

McCarthy et al., "Some Philosophical Problems From the Standpoint of Artificial Intelligence," [online] Computer Science Dept Stanford University, 1969. Retrieved from the Internet URL < http://www-formal.stanford.edu/jmc/mcchay69/mcchay69.html>. pp. 1-51.

Newell et al., "Human Problem Solving," Prentice-Hall, Inc., 1972, pp. 87-140.

Polya, G., "How to Solve it: A New Aspect of Mathematical Method," Doubleday & Company, Inc., 2$^{nd}$ Ed., 1957, pp. v-xvii.

Watson et al., Case-Based Reasoning: A Review, [online] The Knowledge Engineering Review, 1994 [retrieved on Aug. 22, 2005] <URL: http://www.ai-cbr.org/classroom/cbr-review.html>, pp. 1-33.

Amazon.com Frequently Asked Questions [online], SourceForge. net, 2005 [retrieved on Aug. 18, 2005]. <URL: http://www.amazon.com/exec/obidos/tg/browse/-/13316081/ref=pd_ys_help_iyr/103-5110429-2895835 >, pp. 1-6.

Fuchs et al., *Controlled Natural Language Can Replace First-Order Logic* [online] Retrieved on Jul. 20, 2005. Retrieved from the Internet: <URL: http://www.ifi.unizh.ch/groups/req/ftp/papers/ASE99.pdf>.

Sowa, John F. "Controlled English" [online]. John F. Sowa 1999, 2004, [retrieved on Jul. 20, 2005]. Retrieved from the Internet: <URL: http://www.jfsowa.com/logic/ace.htm>.

Schwitter and Fuchs, *Attempto From Specifications in Controlled Natural Language Towards Executable Specifications*. Presented at EMISA Workshop "Natürlichsprachlicher Entwurf von Informationssystemen—Grundlagen, Methoden, Werkzeuge, Anwendungen" May 28-30, 1996. Ev. Akademie Tutzing (pp. 1-15).

"Know the Rules!" [online]. European Business Rules Conference 2005, [retrieved on Jul. 20, 2005]. Retrieved from the Internet: <URL: http://www.eurobizrules.org/speakers/hoppen.htm>.

Jurafsky & Martin, 2000, *Speech and Language Processing: An Introduction to Natural Language Processing, Computational Linguistics, and Speech Recognition*, Chapter 1, pp. 1-18, Prentice Hall.

Prager et al, "Reason: An Intelligent User Assistant for Interactive Environments," IBM Systems Journal, IBM Corp., Armonk, New York, Jan. 1990, 29(1): 141-164.

Smith et al, "Intelligent Help—The Results of the Eurohelp Project," ICL Technical Journal, Oxford, GB, 7(2): 328-361 (1990).

Kubrick and Clarke, screenplay of 2001: *A Space Odyssey. Knowledge in Speech and Language Processing*, [online] Retrieved from the Internet: <URL: http://www.cs.colorado.edu/~martin/SLP/slp-chl.pxif> pp. 1-18

European Examiner C. Lopes Margarido, Extended European Search Report for Application No. 06 024 314.4 , dated Apr. 10, 2007, 7 pages.

European Examiner Marc Stauch, Extended European Search Report for Application No. 06 021 908.6, dated Feb. 20, 2007, 4 pages.

European Examiner G. Del Castillo, Extended European Search Report for Application No. 06021742.9, dated Jun. 22, 2007, 3 pp.

European Examiner G. Del Castillo, EPO Non Final Office Action in App. No. 06 021 742.9, mailed Mar. 6, 2008, 11 pages.

Sommerville, "Chapter 4: Software processes and Chapter 6: Software requirements," Software Engineering, Seventh Edition, Pearson Education, 2004, pp. 74-79 and 118-119.

U.S. Examiner Greg Borsetti, USPTO Final office Action in U.S. Appl. No. 11/269,784, mailed Apr. 23, 2009, 21 pages.

U.S. Examiner Greg Borsetti, USPTO Non Final Office Action in U.S. Appl. No. 11/269,784, mailed Oct. 29, 2008, 19 pages.

U.S. Examiner Greg Borsetti, USPTO Non Final Office Action in U.S. Appl. No. 11/269,784, mailed May 22, 2008, 17 pages.

U.S. Examiner Ramsey Refai, USPTO Non Final Office Action in U.S. Appl. No. 11/293,699, mailed Jun. 11, 2009, 9 pages.

U.S. Examiner Ramsey Refai, USPTO Non Final Office Action in U.S. Appl. No. 11/269,780, mailed Apr. 22, 2009, 10 pages.

\* cited by examiner

PROVIDING NATURAL-LANGUAGE INTERFACE TO REPOSITORY

TECHNICAL FIELD

The description relates to generating an ontology by retrieving information from a repository.

BACKGROUND

Computer systems commonly store information in a repository such that it can be used for one or more purposes. For example, the repository can include a database with information organized in tables. The structure of the repository can be configured to fit a particular type of information that it is expected to hold, such as when a custom database is created for a particular type of customer records. Or, the information can be input in a way that fits a predefined structure of the repository, such as when an address is entered according to the particular formatting of a database template.

Computer systems may provide that users can access the information in the repository. A user interface may be generated so that the user can add information to the repository or modify existing information, or run queries on the repository to determine what information it contains. Generating a user interface may require a substantial work effort, and can typically be done only by a system administrator or someone with detailed knowledge about the repository. Moreover, the resulting interface may be technically complex and therefore require the user to have expert knowledge about the repository or its contents.

SUMMARY

The invention relates to generating an ontology for a repository, to be used in interpreting user-entered natural-language statements.

In a first general aspect, a computer-program product tangibly embodied in an information carrier comprises instructions that when executed cause a processor to perform operations for providing a natural-language interface to a repository. The operations comprise retrieving information from at least one repository, and generating a computer-readable ontology using the information. The computer-readable ontology is configured for use in interpreting user-entered natural-language statements regarding the at least one repository.

Embodiments may include any or all of the following features. The information may comprise metadata. The metadata may be retrieved from a table in the repository, and may comprise a table name and at least one attribute included in the table. Several attributes may be retrieved from the table and the computer-readable ontology upon being generated may indicate an association between the several attributes. The information may comprise at least one value associated with a property. The computer-readable ontology upon being generated may indicate a data type of the at least one value. Several values associated with the property may be retrieved, and the computer-readable ontology upon being generated may indicate a range of the several values. The computer-readable ontology may comprise a pointer structure associated with the repository. The computer-readable ontology may comprise an index of the repository. The operations may further comprise interpreting a first user-entered natural-language statement regarding the at least one repository. Interpretation may comprise identifying, in the first user-entered natural-language statement, at least one attribute existing in the repository. The interpretation may further comprise determining whether the first user-entered natural-language statement has a value associated with the attribute. When the first user-entered natural-language statement has the value associated with the attribute, may further comprise using the value in a predefined operation. When the first user-entered natural-language statement has no value associated with the attribute, the operations may further comprise outputting a stored value for the attribute retrieved from the repository. Interpretation may comprise using at least one expression pattern.

In a second general aspect, a computer system comprises at least one repository and an ontology-generating module generating a computer-readable ontology using information retrieved from the at least one repository. The computer-readable ontology is configured for use by the computer system in interpreting user-entered natural-language statements regarding the at least one repository.

Embodiments may include any or all of the following features. The ontology-generating module may retrieve metadata from a table in the repository and generate the computer-readable ontology to indicate an association between several attributes included in the metadata. The ontology-generating module may retrieve several values from the repository associated with a property and generate the computer-readable ontology to indicate a range of the several values. The computer system may further comprise an interpreting module that uses the computer-readable ontology in interpreting a first user-entered natural-language statement regarding the at least one repository. The module may: (a) determine whether the first user-entered natural-language statement has a value associated with an attribute; (b) cause a predefined operation using the value to be performed upon determining that the first user-entered natural-language statement has the value associated with and (c) cause a stored value for the attribute retrieved from the repository to be output upon determining that the first user-entered natural-language statement has no value associated with the attribute.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
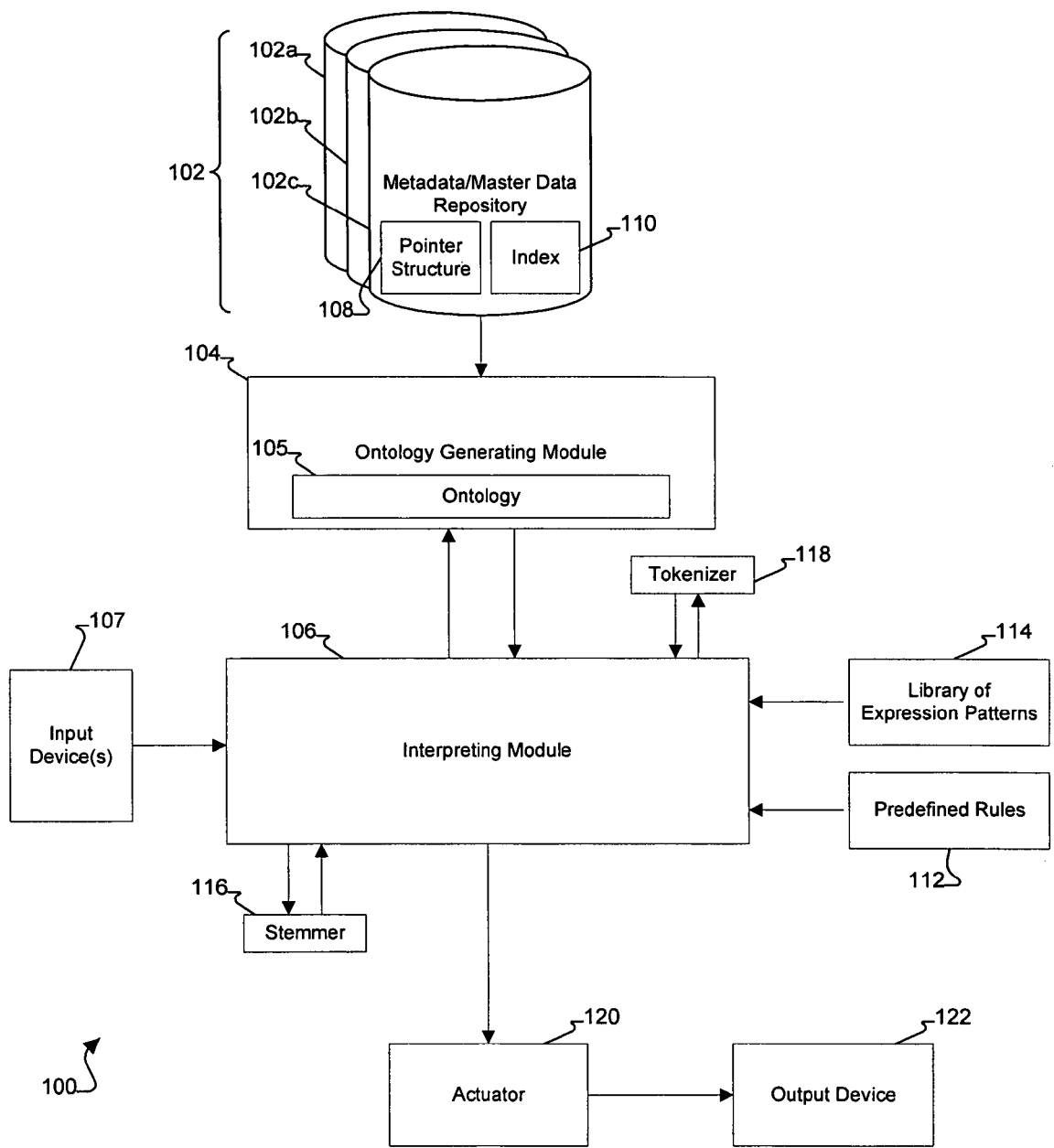
FIG. 1 is a block diagram of a system that provides a natural-language interface to a repository.

FIG. 1 is an exemplary block diagram of a computer system capable of providing a natural-language interface to a data repository. The computer system retrieves information from a repository and generates a computer-readable ontology using the retrieved information. The ontology can be interpret user-entered statements.

Referring to FIG. 1, computer system 100 includes a data repository 102, an ontology generating module 104, and an interpreting module 106. Multiple data repositories may exist in this system, and the system may generate an ontology for any or all of them. The data repository may contain information in the form of "metadata" or "master data." The ontology generating module 104 uses information from the at least one data repository 102 to create computer-readable ontology.

The interpreting module 106 may use one or more translate statements received from a user into computer-readable values.

The ontology generating module 104 creates a computer-readable ontology using information retrieved from a repository. Creation of a unique computer-readable ontology enables the computer system to interface with user-entered natural-language statements and understand the implication statements.

The ontology generating module 104 may use metadata retrieved from a table in the data repository 102 to generate the computer-readable ontology to indicate an association between at least one attribute included in the metadata. Metadata are arranged categorically based on the properties they define in the data repository 102. If the computer system 100 retrieves metadata from a table in the data repository 102, the system 100 searches for a value matching at least one attribute contained in the metadata. For example, all the properties that can be used for defining data in the repository such as table name or subject matter may be listed in the taxonomy.

The ontology-generating module 104 may use master data retrieved from the data repository 102 to generate computer-readable ontology. Master data are arranged depending on the values they describe, such as a string or a number. For example, the types of values (such as string, number, etc.) that can be assigned to the properties can be listed in the ontology. The ontology-generating module 104 could use both metadata and master data to build ontology 105. It is possible to retrieve several attributes from the data repository 102 that are associated with a property and determine a range of several possible values. For example, the system 100 could retrieve several numerical attributes from a data repository table to examine. Additionally, the system 100 could associate the attribute "age," with a typical range of values. This range will most likely never exceed 100, but is more likely to be less than 65, for example in an employee database table. The system 100 could learn that a typical range for "age" is a given set of values under 100, thereby allowing the data repository to associate probable ranges with the attribute, which can be useful in interpreting new entries to the system.

The interpreting module 106 included in the computer system 100 analyzes user-entered statements, using the ontology, to determine what action the statement is requesting from the system. A variety of utility modules may be used to analyze semantics in the user-entered statements.

Users may want to access the computer system, and particularly, the repository, for several reasons, such as to find out what is stored there, to enter or modify information, or to have any other kind of predefined operation performed. The system 100 may receive natural-language instructions from a user in form of a statement to initiate the performance of a task. The interpreting module 106 receives this natural-language statement and determines whether the data contains a value associated with an attribute. For example, a user could enter "Attribute X." The system may attempt to verify that Attribute X exists in the data repository. If Attribute X does not exist in the repository, the system may query a user for more information. If Attribute X is found in the repository, the system recognizes that the statement contains no value for Attribute X. Therefore, the system assumes that the user is asking for the value of Attribute X, and will output it. If, instead, the user enters "Attribute X 123.456," the system will determine whether "123.456" is a valid value for Attribute X. If so, the system performs a predefined operation using the value.

Many different types of operations can be performed upon determining that the user statement contains a value for the attribute. The operations may include outputting information, processing information without making a specific output, or using the value to determine an action parameter, to name just a few examples. The predefined operation may be determined using another constituent of the entered statement. For example, if the statement names an action such as "store'" then the system stores the entered value. In contrast, if the statement names an action such as "add," the system adds the entered value to another one. The other value may be specified in the statement or associated with the entered value in another way, such as by having a common attribute. In the above example where the system determines that "Attribute X 123.456" is a valid value for the Attribute X, the system may assume that the user wants to store the value 123.456 for Attribute X in the data repository 102. The predefined operation then includes storing the value for Attribute X.

The interpreting module 106 may use information in the repository, a set of predefined rules 112, or a library of expression patterns 114 to interpret user entered statements. The library of expression patterns 112 may recognize a specific expression entered by a user. For example, a calendar date entered by a user may be in the form "12/22/2010," and a computer readable ontology may have an expression pattern set up for a calendar date in the form "on $monthday of $monthname [in yearnum]." The expression pattern may be interpreted by the system as, "one day of the month denoted by a number from 1 to 31, of a monthname such as September, followed by an optional part denoting a year containing a possible year number." The interpreting module 112 utilizes the library of expression patterns to recognize a user has entered a calendar date. The interpreting module 106 may also use other utility modules to interpret user-entered statements. For example, the interpreting module 106 may utilize a stemmer utility 116 to break user entered statements into word forms or a tokenizer utility 118 to reduce user entered statements to their lexical roots. It is also possible for the interpreting module 106 to utilize both a stemmer utility 116 and a tokenizer utility 118 to interpret user-entered statements.

Upon the completion of the interpretation, an actuator 120 executes the interpretation result, for example by storing the value in the data repository 102 or by sending obtained data to an output device 122. The actuator 120 may produce output in the form of information that the user asks for, relevant values from the repository or a query for more information. For example, the system 100 could receive a request from a user to send a package overnight to "first name, last name" at "headquarters." The system 100 parses through this statement using the interpreting module 106 to determine if any of the entered statement attributes are associated with values in the repository 102. If no suitable association can be made between an attribute and a value, the system 100 may query the user for additional information regarding the statement entered. If an attribute and a value can be associated, the value is hypothesized to be the value of the attribute and this value is stored in a data repository. If multiple attributes correspond to a value, the value that is closest to the attribute is hypothesized to be the strongest association. For example, if the value 123.456 could be the value for either of Attribute tokens X, Y or Z, the system picks the attribute token that is placed nearest the value in the statement. The system 100 continues to parse through the entire statement and begins to create associations from statement attributes to values in the data repository. For example, the system 100 could analyze the statement "first name, last name," combine it with "overnight," and infer that this is the beginning of an address and further that it is the value of the "address name" attribute. The system has created a computer-readable ontology that understands the user has requested the task "send to address overnight." The system 100 may respond with queries about how large the item is, cost incursion, or sender information. After completion of the task, the system 100 awaits another user statement.

Figure 2:
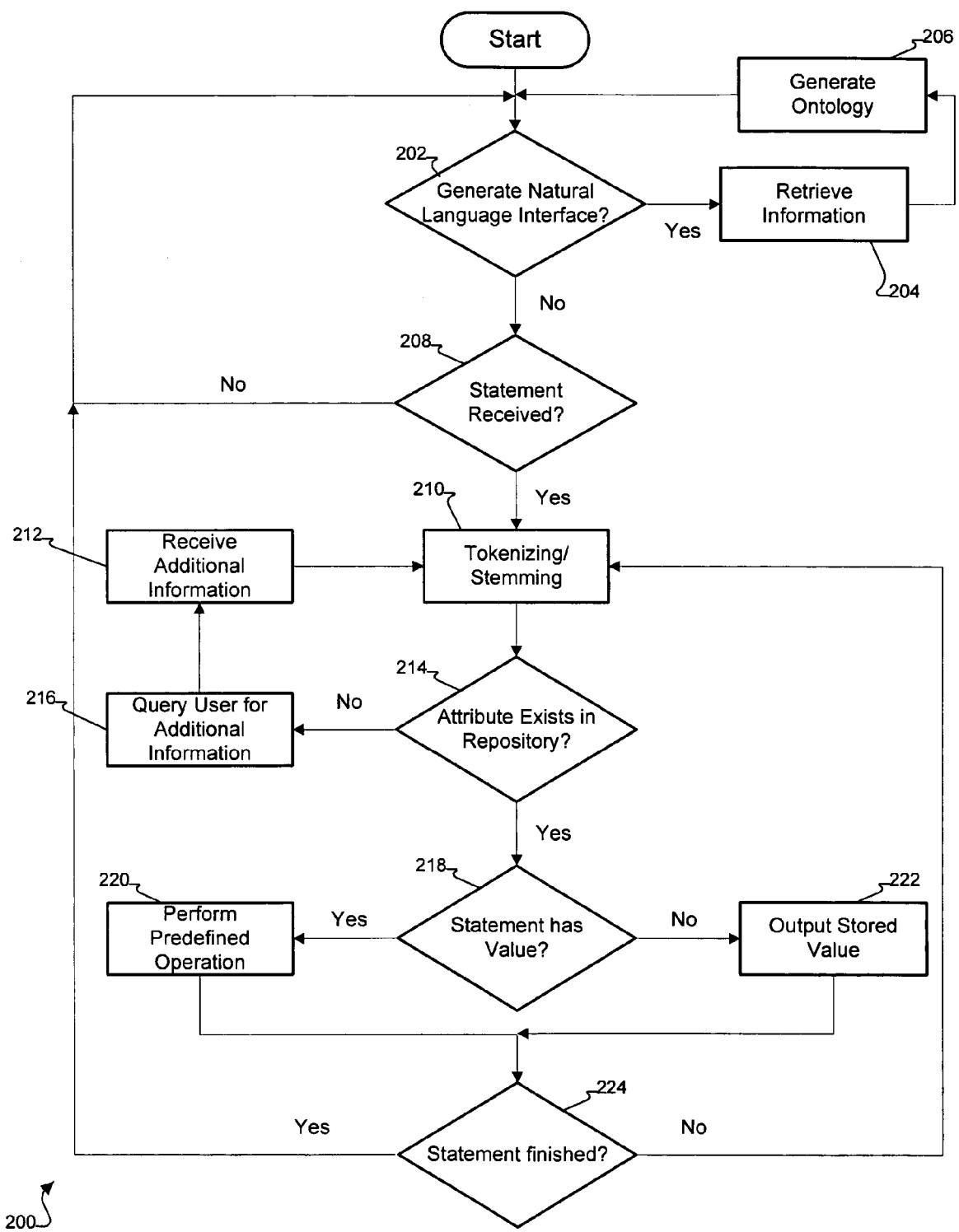
FIG. 2 is a flow chart illustrating a process of automatically generating a natural-language interface.

FIG. 2 is a flow chart of exemplary operations 200 for providing a natural-language interface to a repository. The operations 200 can be performed, for example by the system 100. A processor executing instructions stored in a computer program product can perform the operations 200. The operations 200 begin in step 202 with the inquiry of whether a natural-language interface is to be created. The system 100 may determine to create a natural-language interface upon a system administrator's instruction or upon the occurrence of a predetermined event, such as the addition of a new repository. If the system 100 determines in step 202 that a natural-language interface should be generated for a repository, the system 100 retrieves information from the data repository in step 204.

Generally, the system may analyze predefined aspects of the retrieved information to determine characteristics of the database that are useful in interpreting natural-language statements about the repository. For example, a database table may exist in a repository 102 with the table name "employee." Any interaction in the system involving a name could prompt the system to access this particular database table and the metadata comprising the table. Metadata comprising the "employee" table may be attributes common to all employees such as id number, age, first name, last name or salary. The system could also receive (first name, last name) and access a second database table named "machine." Examples of metadata comprising the "machine" table may be id number, name, age or price. Both database tables have attributes in common such as id number and age, however, only the "employee" database table has a first name and a last name. The interpreting module 106 may analyze the overlap of attributes and examine the context to find disambiguating attributes such as (first name, last name) to determine the actual value of the attribute. The system may access master data from the repository 102 to assign a value to a statement or to output a value for an attribute. For example, the system could extract a value of "36" from a data repository. The interpreting module 106 in system 100 could determine that this value has an integer data type associated with it, which can be useful in interpreting statements from users. Also, the fact that the attribute "age" occurs in both (or several) tables is useful to know because the system may need to determine which one of them the user is referring to. By extracting several "age" values from the different tables, the system may be able to define ranges for the respective values, for example so that the system interprets the input "age 2 years" as referring to a machine and not to an employee.

The ontology may be created as a separate entity stored in association with the ontology generating module 104 (shown as ontology 105) or in form of a pointer structure 108 or an index 110, here shown stored in the repository. For example, the ontology may contain rules of the form:

IF age=attribute_of(employee) THEN age has_type(year) AND years quantity is integer <100 and age >14.

The rule means that if the system determines that the attribute age is contained in an employee object, then the attribute age has the type year and the quantity of years is always less than 100. Similarly, the attribute age always has a value above 14.

Such a rule can be referred to as a constraint or an axiom (in an ontology context), and it can be generated empirically by evaluating the contents of the repository, such as to determine its minimal and maximal values. For example, upon accessing the repository it may be found that all attributes "age" that are part of employee objects have the type years, and that this type never is used with values over 100. Also, it can be determined that the values of the age attribute are always greater than 14. Thus, the above rule can be generated.

A rule can be generated also when no type can be identified (for example because it does not occur in the header of any table). Upon accessing the repository and determining the above characteristics except for the name of the type, the type can be defined corresponding to the values that were found, for example integer(<100, >14), meaning integers between 14 and 100.

The generated rule(s) can be stored in form of the index 110 for evaluation of the received attributes. The pointer structure 108 can point to the existing features of the rule, such as the employee object, the attribute_of( ) function and the type integer. If the word age is found in a user-entered statement, the system can consult the rule(s) to find any thereof whose antecedent (the part before the THEN operator), contains the word age.

If, in step 202, there is no instruction for the system to generate a natural-language interface, the system 100 may determine whether a statements in any been received from the user in step 208. A user may enter statements in any form recognizable by an input device connected to the computer system, such as by keystrokes or by speaking into a microphone. For example, a transaction-based system could consist of a user and a voice recognizing computer system that interprets human voices. If the system has not currently received a statement, the process 200 returns to step 202 with the inquiry to generate a natural-language interface.

In contrast, if the system has received a statement in step 208, the statement is subjected to additional processing by utilities such as a tokenizer to reduce the data to its lexical roots or a stemmer to break the data into single word forms. The computer system may include further utilities to interpret user entered statements depending on the type of requested task. The user requires the system to interpret natural-language statements such as a user speaking the phrase "make a transaction with this credit card." The system could receive the statement, attempt to match words or terms therein to system metadata in the data repository, and produce options to the user. In this example, produced user options may include "Purchase Stamps", "Get Cash", "Purchase Movie Tickets", "Check Balance," or "Wire Money." The system may search data in the repository and attempt to associate statement attributes with values from the data repository. If association is not possible, the system 100 may query the user for additional information regarding the statement entered to carry out the user request.

When parsing through the data using the system utilities has been completed, it is verified, in step 214, whether an attribute in the user entered statement can be associated with an attribute contained in the data repository. For example, the user may enter a value that could be associated with any of several attributes without identifying the one to which it relates. If an attribute cannot be definitively identified from the statement, the user is queried for additional information in step 216, for example by asking the user: "Does this value relate to attribute X, Y or Z?" The additional information is received in step 212 and the system re-enters step 210 to tokenize, stem or analyze the new information. If the system can sufficiently interpret the input, for example by associating a user entered statement with an attribute in the repository, the statement is analyzed in step 218 to determine if the statement contains a value associated with the attribute. For example, the words or terms placed most closely to the statement are analyzed to determine if they constitute valid values for the attribute. If the user entered statement is determined to contain an attribute associated with a value, the system performs a predefined operation using the provided value in step 220. For example, the system interprets the statement as a request by the user to update the repository with the provided value, and therefore stores the value in association with the attribute. In contrast, if the system determines in step 218 that the statement does not contain a value associated with the attribute, the system interprets the statement as a request by the user to output the stored value for this attribute. In step 222, the system outputs the stored value from the data repository.

The system continues with step 224 after performing step 220 or step 222. Step 224 inquires if the statement analysis is complete. For example, a loop from step 224 to step 210 provides that the system will continue analyzing the statement until each provided attribute, value, or combination of attribute and value have been addressed. Then, by a loop back from step 224 to step 202, the process 200 begins again with the inquiry of whether a natural-language interface should be generated.

Figure 3:
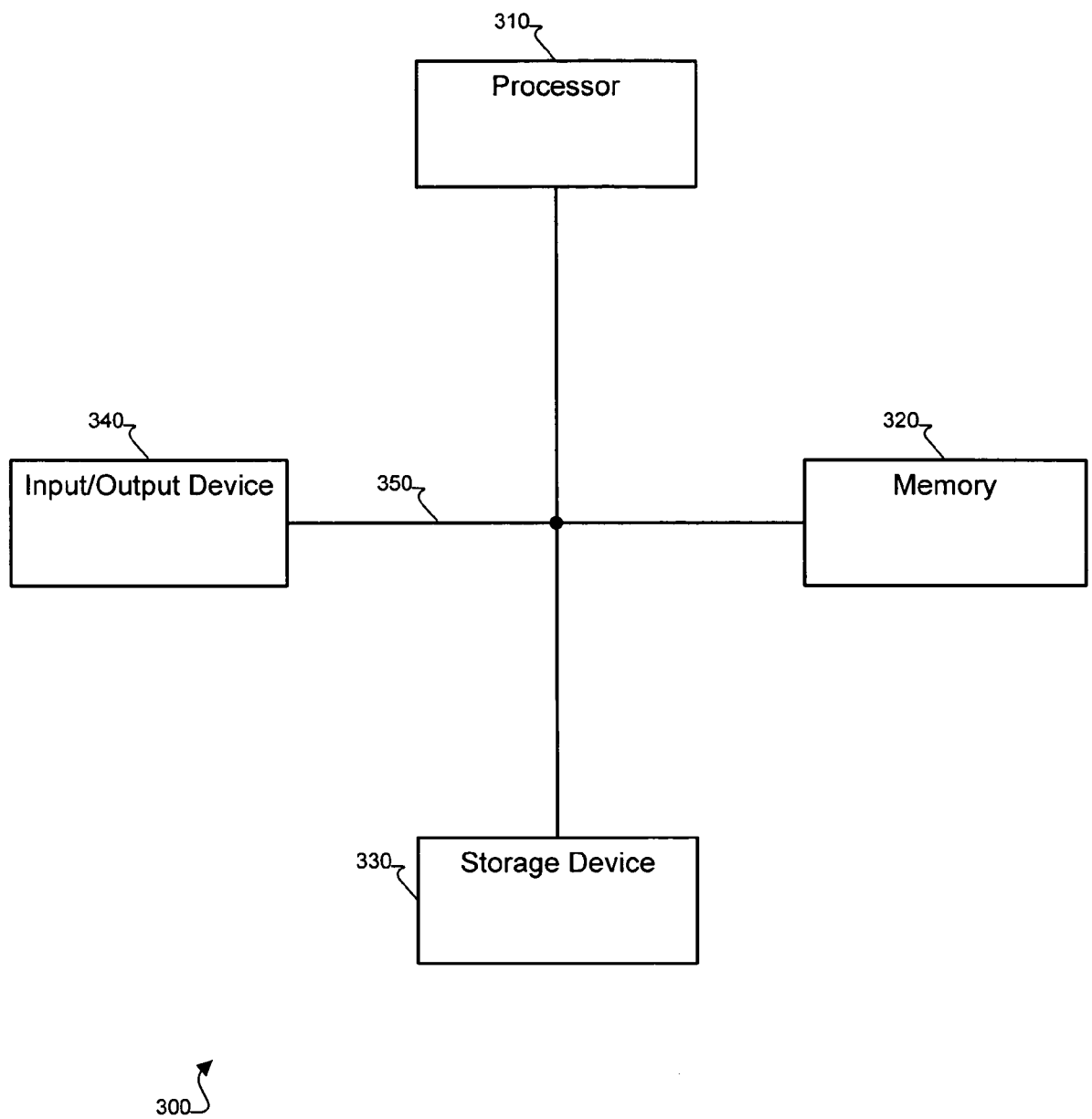
FIG. 3 is a block diagram of a general computer system.

FIG. 3 is a block diagram of a computer system 300 that can be used in the operations described above, according to one embodiment. For example, the system 300 may be included in either or all of the computer system 100, the ontology generating module 104, and the interpreting module 106.

The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. In one embodiment, the processor 310 is a single-threaded processor. In another embodiment, the processor 310 is a multi-threaded processor. The processor 310 is capable of processing instructions stored in the memory 320 or on the storage device 330 to display graphical information for a user interface on the input/output device 340.

The memory 320 stores information within the system 300. In one embodiment, the memory 320 is a computer-readable medium. In one embodiment, the memory 320 is a volatile memory unit. In another embodiment, the memory 320 is a non-volatile memory unit.

The storage device 330 is capable of providing mass storage for the system 300. In one embodiment, the storage device 330 is a computer-readable medium. In various different embodiments, the storage device 330 may be a floppy disk device, a hard disk device, an optical disk device, or, a tape device.

The input/output device 340 provides input/output operations for the system 300. In one embodiment, the input/output device 340 includes a keyboard and/or pointing device. In one embodiment, the input/output device 340 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computer environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user or a text-to-speech device. The computer can have a keyboard and a pointing device such as a mouse or a trackball, a voice recognizer or a microphone and a speech-recognition program, or any other input device by which the user can input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-program product tangibly embodied in a computer-readable storage device, the computer-program product comprising instructions that when executed cause a processor to perform operations for providing a natural-language interface to a repository, the operations comprising:
   identifying at least one repository from which a new computer-readable ontology is to be created;
   retrieving information from the at least one repository, wherein the retrieved information includes at least a first value of a first attribute and at least a second value of a second attribute;
   determining a first data type of the first attribute based on the first value;
   determining a second data type of the second attribute based on the second value;
   generating the new computer-readable ontology using the retrieved information, the new computer-readable ontology indicating the first data type of the first attribute and the second data type of the second attribute; and
   interpreting a user-entered natural-language statement for accessing the at least one repository using the new computer-readable ontology, including:
      (a) identifying, in the first user-entered natural-language statement, a user-entered attribute name corresponding to the first attribute and the second attribute;
      (b) identifying, in the first user-entered natural-language statement, a user-entered value associated with the user-entered attribute name;
      (c) determining a data type of the user-entered value;
      (d) comparing the data type of the user-entered value to the first data type of the first attribute and the second data type of the second attribute;
      (e) selecting one of the first attribute and the second attribute based on the comparison; and
      (f) using the selected attribute and the user-entered value in a predefined operation for accessing the at least one repository.

2. The computer-program product of claim 1, wherein the information comprises metadata.

3. The computer-program product of claim 2, wherein the metadata is retrieved from the repository, the metadata including a first table name representing a first table in the repository, at least a first attribute name representing the first attribute included in the first table, a second table name representing a second table in the repository, and at least a second attribute name representing the second attribute included in the second table.

4. The computer-program product of claim 3, wherein several attributes are retrieved from the first table and wherein the computer-readable ontology upon being generated indicates an association between the several attributes.

5. The computer-program product of claim 1, wherein several values associated with the first attribute are retrieved and several values associated with the second attribute are retrieved, and wherein the computer-readable ontology upon being generated indicates a first range of the several values of the first attribute and a second range of the several values of the second attribute.

6. The computer-program product of claim 1, wherein the computer-readable ontology comprises a pointer structure associated with the repository.

7. The computer-program product of claim 1, wherein the computer-readable ontology comprises an index of the repository.

8. The computer-program product of claim 1, wherein interpretation comprises using at least one expression pattern.

9. A computer-program product tangibly embodied in a computer-readable storage device, the computer-program product comprising instructions that when executed cause a processor to perform operations for providing a natural-language interface to a repository, the operations comprising:
   identifying at least one repository from which a new computer-readable ontology is to be created;
   retrieving information from the at least one repository, wherein the retrieved information includes multiple first values of a first attribute and multiple second values of a second attribute;
   determining a first range of the first values;
   determining a second range of the second values;
   generating the new computer-readable ontology using the retrieved information, the new computer-readable ontology indicating the first range of the first attribute and the second range of the second attribute;
   interpreting a user-entered natural-language statement for accessing the at least one repository using the new computer-readable ontology, including:
      (a) identifying, in the first user-entered natural-language statement, a user-entered attribute name corresponding to the first attribute and the second attribute;
      (b) identifying, in the first user-entered natural-language statement, a user-entered value associated with the user-entered attribute name;
      (c) comparing the user-entered value to the first range of the first attribute and the second range of the second attribute;
      (d) selecting one of the first attribute and the second attribute based on the comparison; and
      (e) using the selected attribute and the user-entered value in a predefined operation for accessing the at least one repository.

10. A computer system comprising:
    at least one repository from which a new computer-readable ontology is to be created; and
    an ontology-generating module generating the new computer-readable ontology using information retrieved from the at least one repository, the retrieved information including at least a first value of a first attribute and at least a second value of a second attribute, the new computer-readable ontology indicating a first data type of the first attribute based on the first value and a second data type of the second attribute based on the second value;
    an input device that receives a first user-entered natural-language statement for accessing the at least one repository; and
    an interpreting module that uses the computer-readable ontology in interpreting the first user-entered natural-language statement, wherein the interpreting module:
       (a) identifies, in the first user-entered natural-language statement, a user-entered attribute name corresponding to the first attribute and the second attribute;
       (b) identifies, in the first user-entered natural-language statement, a user-entered value associated with the user-entered attribute name;
       (c) determines a data type of the user-entered value;
       (d) compares the data type of the user-entered value to the first data type of the first attribute and the second data type of the second attribute;
       (e) selects one of the first attribute and the second attribute based on the comparison; and
       (f) uses the selected attribute and the user-entered value in a predefined operation for accessing the at least one repository.

11. The computer system of claim 10, wherein the ontology-generating module retrieves metadata from the repository, the metadata including a first table name representing a first table in the repository, at least a first attribute name representing the first attribute included in the first table, a second table name representing a second table in the repository, and at least a second attribute name representing the second attribute included in the second table.

12. The computer system of claim 10, wherein the ontology-generating module retrieves several values from the repository associated with the first attribute and several values associated with the second attribute, and generates the computer-readable ontology to indicate a first range of the several values of the first attribute and a second range of the several values of the second attribute.

* * * * *